United States Patent Office 3,491,994
Patented Jan. 27, 1970

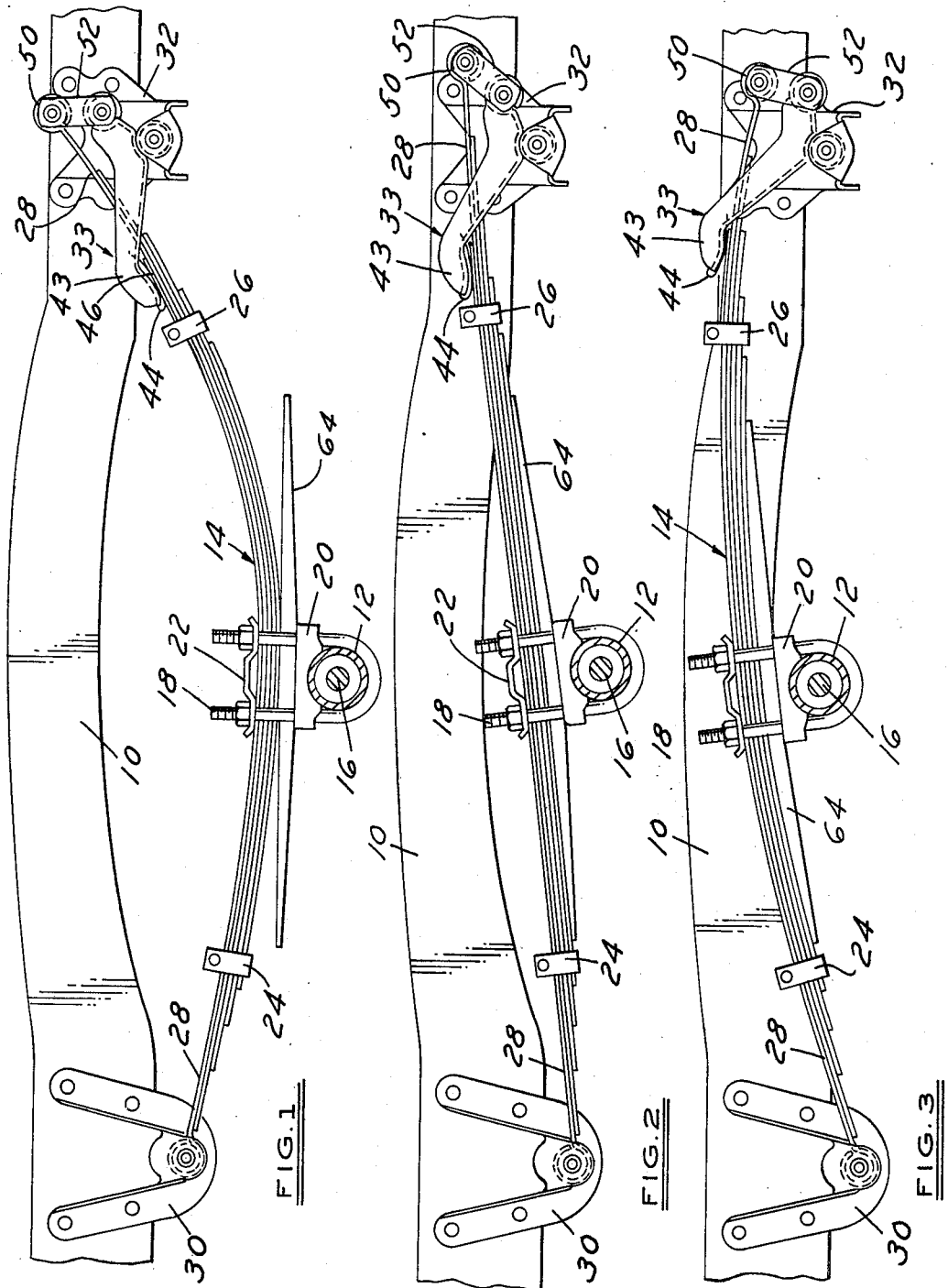

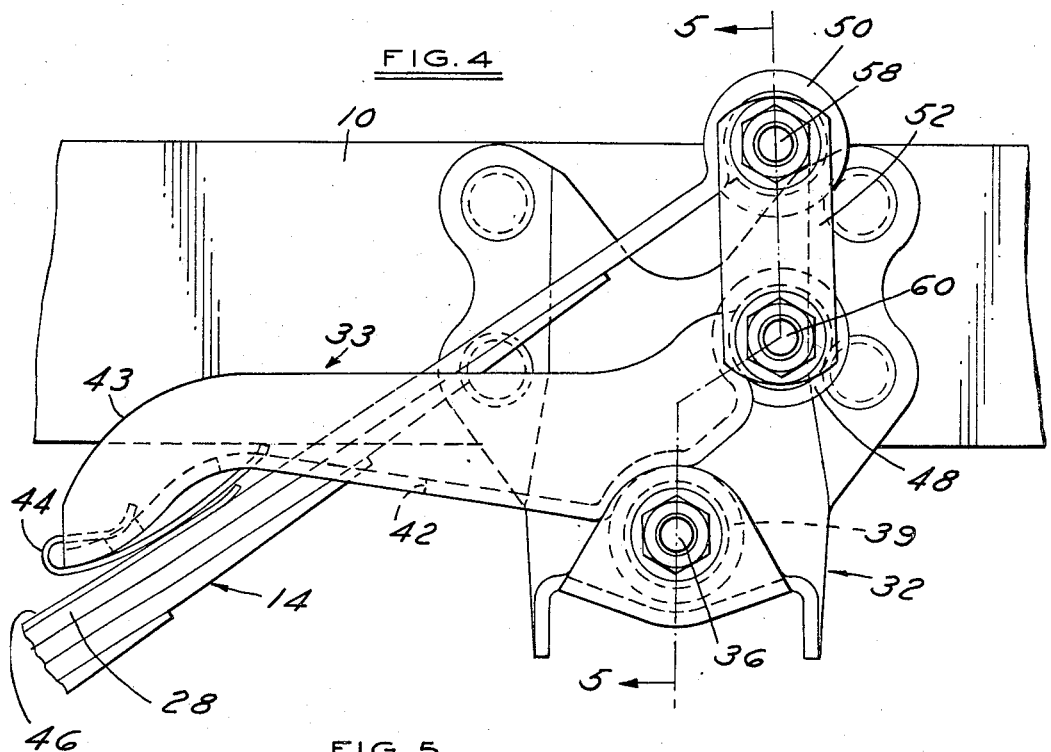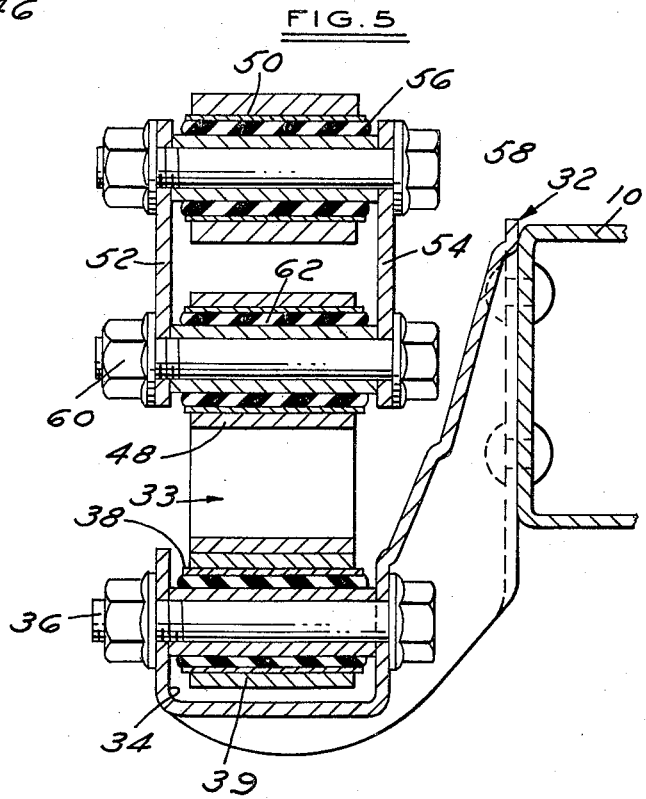

3,491,994
LEAF SPRING VEHICLE SUSPENSION
Donald F. Reynolds, Ypsilanti, Mich., assignor to Ford Motor Company, Dearborn, Mich., a corporation of Delaware
Filed Sept. 8, 1967, Ser. No. 666,326
Int. Cl. B60g 11/02; F16f 1/16; B60k 17/00
U.S. Cl. 267—54                                    3 Claims

ABSTRACT OF THE DISCLOSURE

A leaf spring vehicle suspension having one end of the leaf spring connected to the vehicle chassis by means of two serially joined shackles one of which has an extending portion that bears against the leaf spring at a point spaced from the end of the spring. This construction changes the rate of the leaf spring in response to a change in vehicle loading.

Background of the invention

In trucks that are designed to carry a high load there is a considerable spread between the laden and unladened weight of the vehicle. In order to accommodate the high load, it is customary to provide a multistage spring or to provide helper springs in conjunction with the main suspension springs of the vehicle. The multiple spring arrangement attempts to provide the vehicle with a low rate or soft spring when unladened and high rate or stiff springing to support the maximum vehicle load.

While suspensions of that construction meet certain of the objectives, they are a compromise and have the disadvantage of not completely accommodating the extremes of operation. They do not have a sufficiently low spring rate in the unladened condition so as to provide a comfortably riding vehicle. In addition, often there is insufficient spring resistance available to support maximum or overload conditions without excess deflection of the spring.

Brief summary of the invention

The present invention provides an improvement in leaf spring suspensions particularly for trucks wherein a soft ride resulting from a low spring rate is obtained when the vehicle is empty. When it is fully loaded or overloaded, the springs have a high rate.

This objective is achieved by a double shackle construction connecting one end of each leaf spring to the vehicle chassis. The construction includes a compensating shackle that is pivotally mounted on the chassis and has an extending arm that bears against the spring at a point spaced from the end of the spring. The end of the spring is connected to the compensating shackle by a second shackle or link.

With the arrangement of this invention, the full length of the leaf spring flexes during an unladened condition to provide a soft ride corresponding to its low spring rate. When the vehicle is loaded, the extending arm of the compensating shackle supports the spring at a point spaced from its end whereby the spring has an effective length that is shorter than its actual length. This effective foreshortening of the spring increases the spring rate so that it is capable of supporting higher loads at a greatly reduced amount of unit deflection.

The compensating shackle bears against the leaf spring in an increasing fashion proportional to the increase in load on the vehicle. In this manner, the effective spring rate is gradually increased as the vehicle is loaded rather than having an abrupt change in spring rate as occurs where a two-stage spring is employed.

Therefore, the principal object of this invention is to provide a leaf spring suspension with a compensating shackle that gradually increases the spring rate so that the suspension has a low rate and a soft ride when unladened and a high rate for supporting the vehicle when it is fully loaded.

Brief description of the drawings

The many objects and advantages of the present invention will become apparent from the following description and the accompanying drawings in which:

FIG. 1 is a side elevational view of a motor vehicle suspension constructed in accordance with this invention and in which the various suspension components are shown when the vehicle is in an unladened condition;

FIG. 2 is a side elevational view corresponding to FIG. 1 wherein the various suspension components are shown in a fully loaded condition;

FIG. 3 is a side elevational view showing the suspension in full jounce;

FIFG. 4 is an enlarged elevational view of the connection between the spring end and the vehicle chassis; and FIG. 5 is a sectional view taken along section lines 5—5 of FIG. 4.

Detailed description of the invention

Referring now to the drawings for a more detailed understanding of the invention, FIG. 1 illustrates a leaf spring suspension system incorporating the presently preferred embodiment of this invention. In FIG. 1, a vehicle chassis frame 10 is supported on an axle housing 12 by means of a leaf spring 14.

The axle housing 12 extends transversely of the vehicle and encloses a driving axle shaft 16 that is connected to left and right driving wheels.

The leaf spring 14 comprises a plurality of single leaf elements that are secured together and rigidly fastened to the axle housing 12 by means of U-bolts 18. A saddle piece 20 engages the axle housing 12 and cooperates with a spring clamp 22 to trap the spring leaves together when the U-bolts 18 are tightened. The several leaf spring elements of the spring 14 are contained by spring clips 24 and 26. The main leaf 28 of the leaf spring 14 is provided with an eye 29 at its forward end which is connected to a frame bracket 30 by means of a conventional rubber bushing.

As seen in FIG. 4, a unique link means is provided in accordance with the invention for connecting the rear end of the spring 14 to the chassis frame 10. The connection comprises a bracket 32 that is riveted to the frame member 10 and supports a compensating shackle 33. The bracket 32 has a channel-shaped portion 34 that receives a pivot bolt 36. The bolt 36 passes through a rubber bushing 38 centered in the shackle eye 39 and provides a pivotal connection for the compensating shackle 33.

The compensating shackle 33 has a generally elongated configuration and a channel-shaped cross section with an opening at 42 through which the end of the leaf spring 14 passes. The shackle 33 has an extending portion 43 directed toward the center of the spring 14 that passes over the upper spring leaf 28. A sheet metal spring member 44 is secured to the extending arm 43 of the compensating shackle 33 and forms a bearing surface that is adapted to engage the leaf spring assembly 14. A sheet metal member 46 is positioned by the spring clip 26 along the upper surface of the upper spring leaf 28 and forms a bearing for engagement with the spring member 44.

The compensating shackle 33 is provided with an eye 48. In a conventional fashion, the rear end of the upper spring leaf 28 is also provided with a connecting eye 50. The shackle eye 48 is connected to the spring eye 50 by means of a pair of shackle links 52 and 54. A rubber bushing 56 is situated in the spring eye 50 and receives a pivot bolt 58 that passes through the upper ends of the links 52, 54. Similarly, bolt 60 passes through the end of the links 52, 54 and through the center of the bushing 62 situated in the shackle eye 48.

Operation

Attention is now directed to FIGS. 1, 2 and 3 which show the relationship of the various components during laden, unladened and full jounce conditions of the suspension system. In FIG. 1, the spring 14 assumes its normal position for a vehicle in an unloaded condition. It will be noted that the auxiliary spring leaf 64 is not in engagement with the other leaves of the spring 14. Under the conditions of FIG. 1, the compensating shackle 33 bears very lightly against the bearing pad 46. In FIG. 2, where the vehicle is carrying a full load, the extending arm 43 of the shackle 33 bears against the spring 14 whereby a major portion of the vehicle load is carried directly through the shackle 33 bypassing the shackle links 52 and 54.

In FIG. 3, the extreme condition is reached where the suspension is in full jounce. Under this condition, the shackle arm 43 carries practically the full load of the spring 14. In effect, this reduces the length of the spring 14 by an amount approximately equal to the distance from the spring eye 50 to the point of engagement of the arm 43. This increases the rate of the spring 14 making it stiffer and capable of carrying extreme loads without excessive deflection. In the FIG. 2 arrangement, the arm 43 carries most of the load, although some is carried by the links 52, 54. In the normal load position the effective length of the spring 14 is shortened but not by the full extent of the distance between the spring eye 50 and the end of arm 43 as is the case in FIG. 3.

The spring member 44 on the end of shackle arm 43 serves to maintain the arm 43 in arrangement with the spring 14 at all times, even under conditions of full rebound. The spring 44 prevents a rattling of the components of the suspension system when the wheel moves from jounce to full rebound and back to jounce again.

With a suspension in accordance with this invention, a softer ride is obtained when the vehicle is unladened. The rate of the spring will increase gradually and will continue to increase as more load is placed on the vehicle. Under a fully loaded or overloaded condition, the spring will have a higher rate than is customary for a conventional multiple spring combination.

The foregoing description presents the presently preferred embodiment of this invention. Modifications and alterations may occur to those skilled within the art that will come within the scope and spirit of the invention.

I claim:
1. A motor vehicle suspension system having a frame, a wheel support member, a leaf spring secured to said wheel support member, first means pivotally connecting one end of said spring to said frame, second means connecting the other end of said leaf spring to said frame, said second means comprising a compensating shackle pivotally connected to said frame, a tension shackle having one of its ends pivotally connected to said compensating shackle and the other of its ends pivotally connected to said other end of said leaf spring, said other leaf spring end being positioned above and rearwardly of the connection between said compensating shackle and said frame, said compensating shackle having an arm portion extending toward said first means and bearing against the upper surface of said leaf spring, said arm exerting a force on said spring in proportion to the load on said suspension system.

2. A motor vehicle suspension system in accordance with claim 1 and including resilient means connected to the end of said arm portion and engaging said leaf spring from full jounce to full rebound of said suspension system.

3. A motor vehicle suspension system having a frame, a wheel support member, a leaf spring secured to said wheel support member, first means pivotally connecting one end of said spring to said frame, second means connecting the other end of said leaf spring to said frame, said second means comprising a compensating shackle pivotally connected to said frame, link means having one of its ends pivotally connected to said compensating shackle and the other of its ends pivotally connected to said other end of said leaf spring, said compensating shackle having an arm portion extending toward said first means and bearing against the upper surface of said leaf spring, said arm portion engaging said leaf spring full jounce to full rebound of said suspension system, said arm exerting a force on said spring in proportion to the load on said suspension system.

References Cited

UNITED STATES PATENTS

| 1,190,966 | 7/1916 | Sprague | 267—54 |
| 1,464,341 | 8/1923 | Rodin | 267—54 |
| 3,137,488 | 7/1964 | Toyer | 280—124 X |

FOREIGN PATENTS

| 1,238,347 | 4/1967 | Germany. |
| 948,793 | 2/1964 | Great Britain. |

A. HARRY LEVY, Primary Examiner

U.S. Cl. X.R.

180—71; 280—124